United States Patent [19]

Shimomura

[11] Patent Number: 4,827,408
[45] Date of Patent: May 2, 1989

[54] MULTI-PURPOSE RECONFIGURABLE COMPUTER SYSTEM HAVING DETACHABLE CIRCUIT FOR MEMORY ADDRESS MAP AND I/O ADDRESS MAP

[75] Inventor: Tsutomu Shimomura, Tokyo, Japan

[73] Assignee: Kabushiki Kaisha Toshiba, Kawasaki, Japan

[21] Appl. No.: 867,450

[22] Filed: May 28, 1986

[30] Foreign Application Priority Data

May 29, 1985 [JP] Japan .................... 60-115901

[51] Int. Cl.[4] .............. G06F 9/02; G06F 9/06; G06F 9/22; G06F 12/06
[52] U.S. Cl. ................................. 364/200
[58] Field of Search ... 364/200 MS File, 900 MS File

[56] References Cited

U.S. PATENT DOCUMENTS

| 4,432,067 | 2/1984 | Nielsen | 364/900 |
| 4,503,491 | 3/1985 | Lushtak et al. | 364/200 |
| 4,530,069 | 7/1985 | Desrochers | 364/900 |
| 4,677,548 | 6/1987 | Bradley | 371/11 |

Primary Examiner—David Y. Eng
Assistant Examiner—Emily Y. Chan
Attorney, Agent, or Firm—Finnegan, Henderson, Farabow, Garrett, & Dunner

[57] ABSTRACT

In a computer system, different portions of the systems of different specifications are incorporated in a detachable LSI or IC card. When the LSI or IC card is exchanged solely or together with software, the systems of the different specifications can be constituted by a single hardware system. Compatibility with conventional equipment can be established without incorporating the software for special-purpose equipment into new software.

11 Claims, 5 Drawing Sheets

FIG. 1B

| LABEL | ACRONYM | NAME |
|---|---|---|
| 1 | μCP | MICROPROCESSOR |
| 2 | AL | ADDRESS LATCH |
| 3 | DEC | ADDRESS DECODER |
| 4 | RAM | RANDOM ACCESS (MAIN) MEMORY |
| 5 | ROM | CONTROL PROGRAM MEMORY |
| 6 | V-RAM | VIDEO MEMORY |
| 7 | VCU | DISPLAY (VIDEO) CONTROL UNIT |
| 8 | BCU | BUS CONVERTER UNIT |
| 9 | DMAC | DIRECT MEMORY ACCESS CONTROLLER |
| 10 | PIC | INTERRUPT CONTROLLER |
| 11 | PIT | TIMER CONTROLLER |
| 12a | CRTC | DISPLAY (CRT) CONTROLLER |
| 12b | AG | ADDRESS GENERATOR |
| 13 | FDC | FLOPPY DISK CONTROLLER |
| 14 | SIO | SERIAL I/O CONTROLLER |

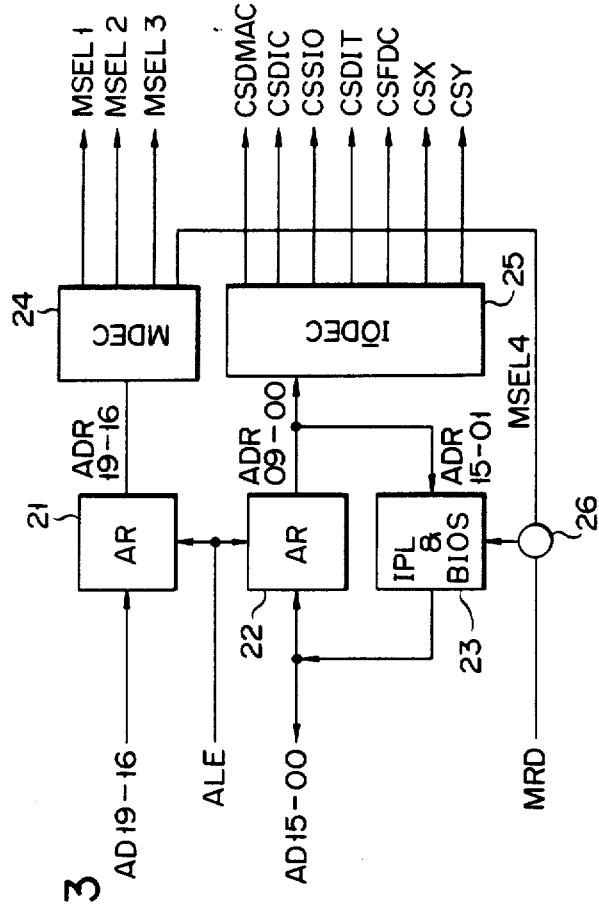
F I G. 3
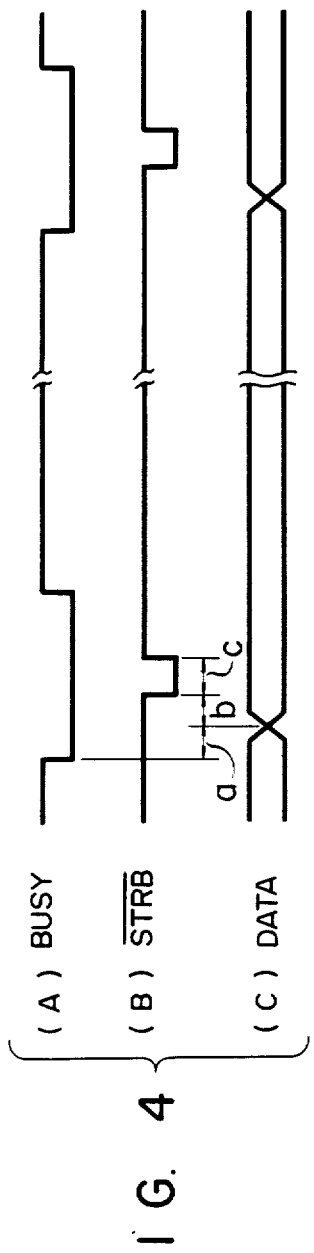
F I G. 4
(A) BUSY
(B) $\overline{\text{STRB}}$
(C) DATA F I G. 6
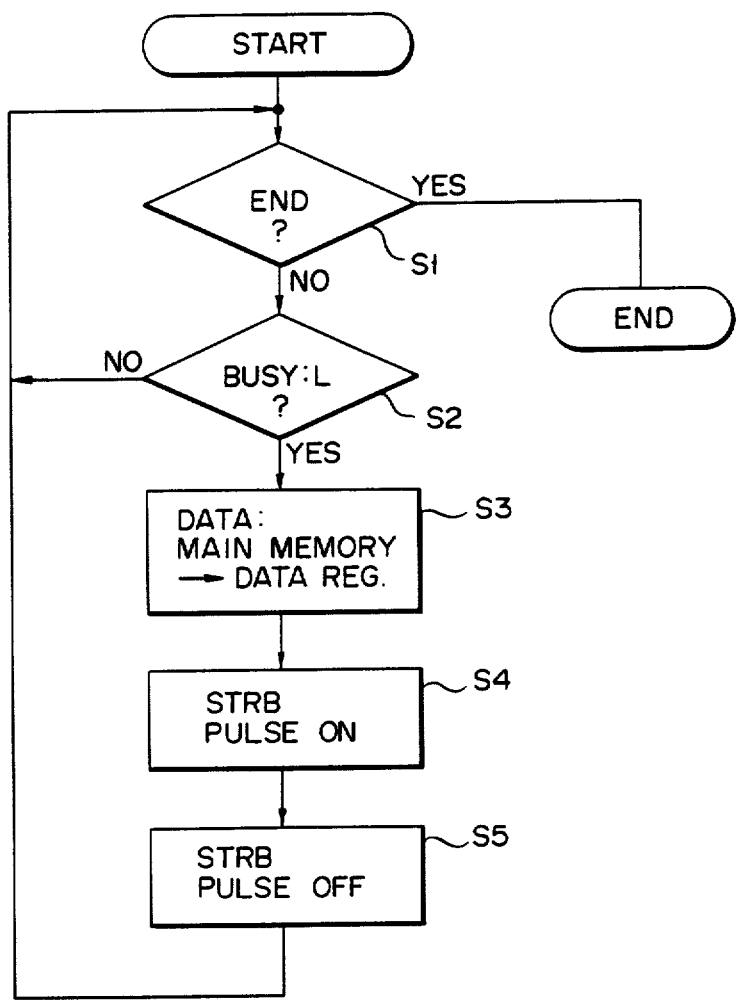

MULTI-PURPOSE RECONFIGURABLE COMPUTER SYSTEM HAVING DETACHABLE CIRCUIT FOR MEMORY ADDRESS MAP AND I/O ADDRESS MAP

BACKGROUND OF THE INVENTION

The present invention relates to a computer system and, more particularly, a multi-purpose compatible computer system which can provide optimum functions for different purposes with a single computer system.

With the recent trends of office automation (OA), user needs have diversed in a variety of applications. When users introduce OA equipment, its effective use as well as its convenience in handling has been discussed. Personal computers and wordprocessors have similar hardware architectures. It is therefore common to add a function of one equipment to the other, i.e., a personal computer function to a wordprocessor or vice versa.

The above functional compatibility is achieved by software in conventional systems. For example, in order to add wordprocessor functions to a personal computer, wordprocessor software (or application software) which operates on a personal compter OS (operating system) is loaded, or an IPL (initial program loader) of the personal computer is utilized to load the wordprocessor software instead of the personal computer OS. In order to add personal computer functions to a wordprocessor, a method opposite to the above can be used.

If different equipment have the same purposes, like different game machines, the compatibility can be attained by only exchanging software. However, since personal computers and wordprocessors are designed for different purposes, they have different hardware features. Therefore, when compatibility is to be achieved for these equipments, software exchange cannot provide satisfactory special purpose, resulting in drawbacks as follows:

1. Sufficient compatibility with conventional equipment cannot be obtained, resulting in functional degradation.
2. Development for software for achieving compatibility takes much time, and special-purpose software must be altered greatly.

When a new model of a personal computer is to be developed, it necessarily has compatibility with the old models. Software developed for the old model must run on the new model. For this purpose, at least a memory address map and an input/output address map of the new model must be the same as those of the old model, thereby interfering with addition of a new function.

SUMMARY OF THE INVENTION

The present invention has been made in view of the above situation, and has as its object to provide a multi-purpose compatible computer system with a lower development cost, wherein a plurality of functions for different purposes can be achieved by single equipment by exchanging part of hardware as easily as exchanging software, in order to meet user needs.

In order to achieve the above object, a multi-purpose compatible computer system for providing optimum functions for various purposes comprises:

a microprocessor (CPU);

at least one of memories and peripheral devices selected in accordance with one of the various purposes;

a plurality of detachable circuits, having common connecting terminals, for providing optimum functions for the various purposes, a detachable circuit being selected from said plurality of circuits in accordance with said at least selected one of memories and peripheral devices; and a connector for connecting one of the detachable circuits to the CPU, the selected at least one memory, and the at least one peripheral device.

As mentioned above, according to the present invention, different portions of systems of different specifications are incorporated in a custom LSI or exchangeable by an IC socket and exchanged together with software, so that single hardware can provide different systems. The present invention has the following advantages:

1. Compatibility with conventional equipment can be obtained without incorporating software developed by the respective special-purpose equipment into new software.
2. Single hardware can provide a plurality of different functions and thus function as two different equipments.
3. Portions of hardware can be exchanged as easily as exchanging ROM cartridges or floppy disks to obtain a full software capability.
4. The memory map and the input/output port map need not be the same as those of conventional equipment to be compatible therewith, allowing an easy addition of new specifications.

BRIEF DESCRIPTION OF THE DRAWINGS

FIGS. 1A and 1B are a block diagram showing a configuration of a conventional computer system; Fig. 1B is a cross-reference list of acronyms used as legends for the elements of FIG. 1A and the full names associated with each acronym.

FIG. 3 shows the address decoder in FIG. 2 in detail;

FIGS. 4A to 4C are timing charts of a standard interface in a printer;

FIG. 6 is a flow chart for operating the printer interface in FIG. 5; and

DETAILED DESCRIPTION OF THE PREFERRED EMBODIMENT

An embodiment of the present invention will be described in detail with reference to the accompanying drawings.

FIG. 1 is a block diagram of a computer system of the most popular hardware configuration such as a personal computer or a wordprocessor which uses a microprocessor. The computer system comprises microprocessor ($\mu$CPU) 1, address latch (AL) 2, address decoder (DEC) 3, main memory (RAM) 4, memory (ROM) 5 storing a control program, video memory (V-RAM) 6, display control unit (VCU) 7, bus converter unit (BCU) 8, direct memory access controller (DMAC) 9, interrupt controller (PIC) 10, timer controller (PIT) 11, display controller (CRTC) 12a, address generator (AG) 12b, floppy disk controller (FDC) 13, and serial input/output controller (SIO) 14. μCPU 1 is a 16-bit microprocessor 8086 available from Intel Corp., U.S.A. AL 2 latches address data output by μCPU 1 through address data bus 15 and outputs the address data to DEC 3, RAM 4, ROM 5, V-RAM 6, and AG 12b through address bus 17. DEC 3 receives address data and generates enable signals 18 such as chip select signals for the respective units and controllers. ROM 5 stores an initial program loader (IPL) program and a basic input/output system (BIOS) program and outputs the programs onto bus 15 upon being accessed. V-RAM 6 exchanges data with bus 15 upon read/write access. BCU 8 performs conversion between a 16-bit bus and an 8-bit bus in order to transfer input/output data between address data bus 15 and I/O bus 16. DMAC 9, PIC 10, PIT 11, CRTC 12a, FDC 13, and SIO 14 transfer data through bus 16. DMAC 9 can be any chip equivalent to Intel 8237, PIC 10 ca be any chip equivalent to Intel 8259, and PIT 11 can be any chip equivalent to Intel 8253.

Figure 1A:
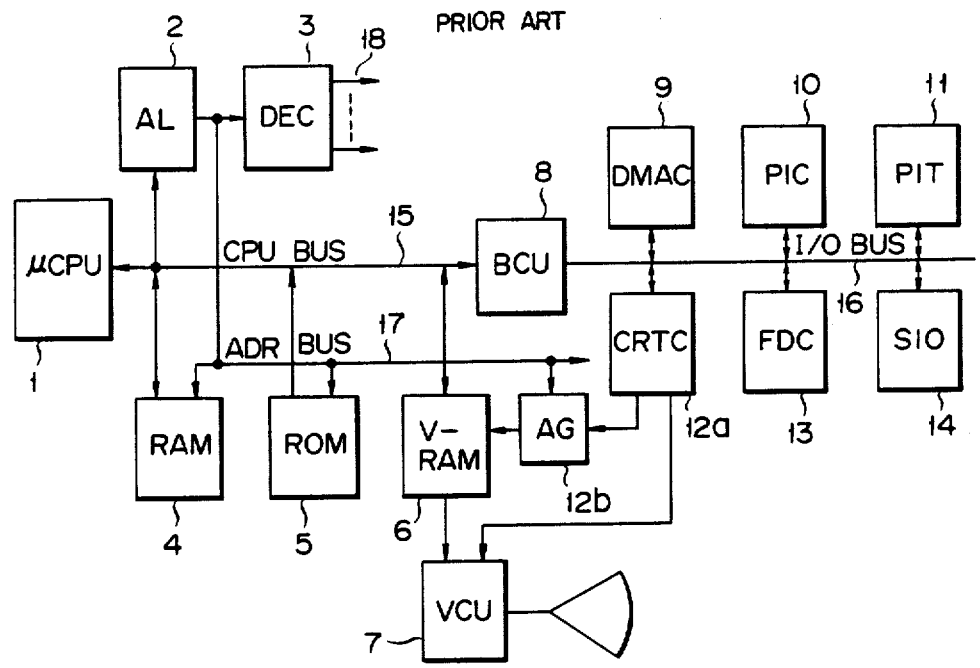

When the hardware configurations of two different systems as in the computer system shown in FIG. 1A are compared, only the memory maps and the input-/output port maps are often different. IN addition to these differences, identical hardware configurations differ from each other due to different channel allocations of LSIs (e.g., DMAC 9 and PIT 11) each having a plurality of channels, different allocations of PIC 10, and so on.

Generally, both a personal computer system and a wordprocessor system each using a microprocessor are designed by hardware of a block diagram in FIG. 1A. Although the system components differ depending on the scale of the equipment, systems of the same scales can be provided with substantially the same constituent components.

An embodiment of the present invention applied to systems A and B which are different in only memory maps and input/output ports will be described hereinafter with reference to FIGS. 2 and 3.

First, logical specifications of the memory maps and input/output port maps of systems A and B are given below:

(System A)

$\text{MSEL1} = \overline{\text{ADR 19}}$ $\text{MSEL2} = \text{ADR 19} \wedge \overline{\text{ADR 18}}$ $\text{MSEL3} = \text{ADR 19} \wedge \text{ADR 18} \wedge \overline{\text{ADR 17}}$ $\text{MSEL4} = \text{ADR 19} \wedge \text{ADR 18} \wedge \text{ADR 17} \wedge \text{ADR 16} \wedge \text{ADR 15} \wedge \text{ADR 14}$ $\text{CSDMAC} = \overline{\text{ADR 09}} \wedge \overline{\text{ADR 08}} \wedge \overline{\text{ADR 07}} \wedge \overline{\text{ADR 06}} \wedge \overline{\text{ADR 05}} \wedge \overline{\text{ADR 04}}$ $\text{CSPIC} = \overline{\text{ADR 09}} \wedge \overline{\text{ADR 08}} \wedge \overline{\text{ADR 07}} \wedge \overline{\text{ADR 06}} \wedge \overline{\text{ADR 05}} \wedge \text{ADR 04} \wedge \overline{\text{ADR 03}} \wedge \overline{\text{ADR 02}} \wedge \overline{\text{ADR 01}}$ $\text{CSSIO} = \overline{\text{ADR 09}} \wedge \overline{\text{ADR 08}} \wedge \overline{\text{ADR 07}} \wedge \overline{\text{ADR 06}} \wedge \text{ADR 05} \wedge \text{ADR 04} \wedge \overline{\text{ADR 03}} \wedge \overline{\text{ADR 02}}$ $\text{CSPIT} = \overline{\text{ADR 09}} \wedge \overline{\text{ADR 08}} \wedge \overline{\text{ADR 07}} \wedge \overline{\text{ADR 06}} \wedge \text{ADR 05} \wedge \text{ADR 04} \wedge \text{ADR 03} \wedge \overline{\text{ADR 02}}$ $\text{CSFDC} = \overline{\text{ADR 09}} \wedge \overline{\text{ADR 08}} \wedge \overline{\text{ADR 07}} \wedge \text{ADR 06} \wedge \overline{\text{ADR 05}} \wedge \overline{\text{ADR 04}} \wedge \text{ADR 03} \wedge \overline{\text{ADR 02}}$ (System B)

$\text{MSEL1} = \overline{\text{ADR 19}} \wedge \overline{\text{ADR 18}}$ $\text{MSEL2} = \overline{\text{ADR 19}} \wedge \text{ADR 18}$ $\text{MSEL3} = \text{ADR 19} \wedge \overline{\text{ADR 18}}$ $\text{MSEL4} = \text{ADR 19} \wedge \text{ADR 18} \wedge \text{ADR 17} \wedge \text{ADR 16}$ -continued $$\text{CSDMAC} = \overline{\text{ADR 09}} \wedge \overline{\text{ADR 08}} \wedge \overline{\text{ADR 07}} \wedge \overline{\text{ADR 06}} \wedge \overline{\text{ADR 05}}$$
$$\wedge \overline{\text{ADR 04}}$$

$$\text{CSPIC} = \overline{\text{ADR 09}} \wedge \overline{\text{ADR 08}} \wedge \overline{\text{ADR 07}} \wedge \overline{\text{ADR 06}} \wedge \text{ADR 05}$$
$$\wedge \overline{\text{ADR 04}} \wedge \overline{\text{ADR 03}} \wedge \overline{\text{ADR 02}} \wedge \overline{\text{ADR 01}}$$

$$\text{CSSIO} = \text{ADR 09} \wedge \overline{\text{ADR 08}} \wedge \text{ADR 07} \wedge \overline{\text{ADR 06}} \wedge \text{ADR 05}$$
$$\wedge \overline{\text{ADR 04}} \wedge \text{ADR 03} \wedge \overline{\text{ADR 02}}$$

$$\text{CSPIT} = \overline{\text{ADR 09}} \wedge \overline{\text{ADR 08}} \wedge \overline{\text{ADR 07}} \wedge \text{ADR 06} \wedge \overline{\text{ADR 05}}$$
$$\wedge \overline{\text{ADR 04}} \wedge \overline{\text{ADR 03}} \wedge \overline{\text{ADR 02}}$$

$$\text{CSFDC} = \text{ADR 09} \wedge \overline{\text{ADR 08}} \wedge \text{ADR 07} \wedge \text{ADR 06} \wedge \text{ADR 05}$$
$$\wedge \text{ADR 04} \wedge \overline{\text{ADR 03}} \wedge \text{ADR 02}$$

The above specifications are summarized to obtain the following tables (note that hexadecimal notation is employed):

TABLE 1

Comparison of Memory Maps

| | System A | System B |
|---|---|---|
| main memory (RAM) | 00000–7FFFF | 00000–3FFFF |
| extension memory (OPTION) | 80000–BFFFF | 40000–7FFFF |
| video-memory (V-RAM) | C0000–DFFFF | 80000–BFFFF |
| IPL & BIOS (ROM) | FC000–FFFFF | F0000–FFFFF |

TABLE 2

Comparison of Input/Output Maps

| | System A | System B |
|---|---|---|
| DMAX | XX00F–XX00F | XX000–XX00F |
| PIC | XX010–XX011 | XX020–XX021 |
| SIO | XX030–XX033 | XX2A8–XX2AB |
| PIO | XX038–XX03B | XX040–XX043 |
| FDC | XX048–XX04B | XX2F4–XX2F7 |

Figure 2:
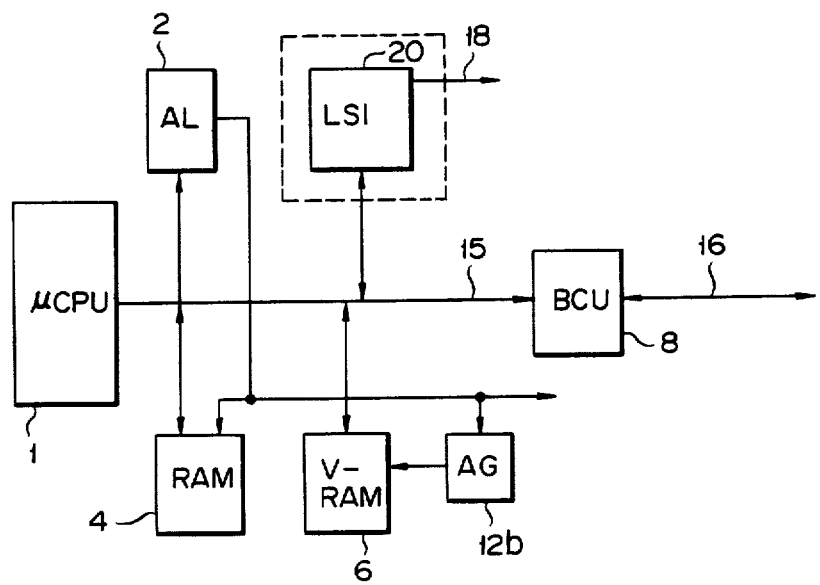
FIG. 2 shows a computer system according to an embodiment of the present invention, in which an address decoder in the computer system of FIG. 1 is designed as an LSI.

FIG. 2 shows an embodiment wherein two systems having different memory and input/output maps as described above are provided. Note that the same reference numerals in FIG. 2 denote the same portions as in the system shown in FIG. 1A. A block denoted by reference numeral 20 is, e.g., an LSI block obtained by the present invention, and is shown in detail in FIG. 3. Address latch 2 has the same circuit configuration as in the LSI and receives external address signals. If a sufficient number of input/output pins are provided on the LSI, latch 2 is not needed.

The embodiment of the present invention will be described with reference to FIG. 3.

The system according to the embodiment comprises address registers (AR) 21 and 22 for latching address data (AD 19-00) in response to an address latch enable signal (ALE), IPL & BIOS memory 23, memory address decoder (MDEC) 24, input/output port address decoder (IODEC) 25, and AND gate 26 for controlling IPL & BIOS memory 23. When both a memory read signal (MRD) and memory select signal MSEL4 are enabled, AND gate 26 outputs a control signal to memory 23. Memory 23 outputs data (program) to address data bus AD 15-00 in response to the control signal.

In this manner, custom LSI 20 shown in FIG. 2 includes all the hardware specification differences of the systems A and B of the embodiment of the present invention. The systems A and B excluding circuits included in LSI 20 can be provided by single hardware. Therefore, when this LSI is made as an IC socket, two different systems can be provided by single hardware by only exchanging the pair of software and the LSI.

The embodiment of the present invention applied to a printer interface will be described with reference to FIGS. 4 to 7.

A interface printer complying with a standard provided by the CENTRONICS company is widely used as an interface for personal computers and wordprocessors. A control timing in this case will be described with reference to FIGS. 4A to 4C. As shown in FIG. 4A, when signal BUSY from the printer goes low, print data is output to a data register as shown in FIG. 4C. Sequentially, when signal STRB is output as shown in FIG. 4B, data is supplied to the printer in response thereto. In this manner print data is transferred.

Figure 5:
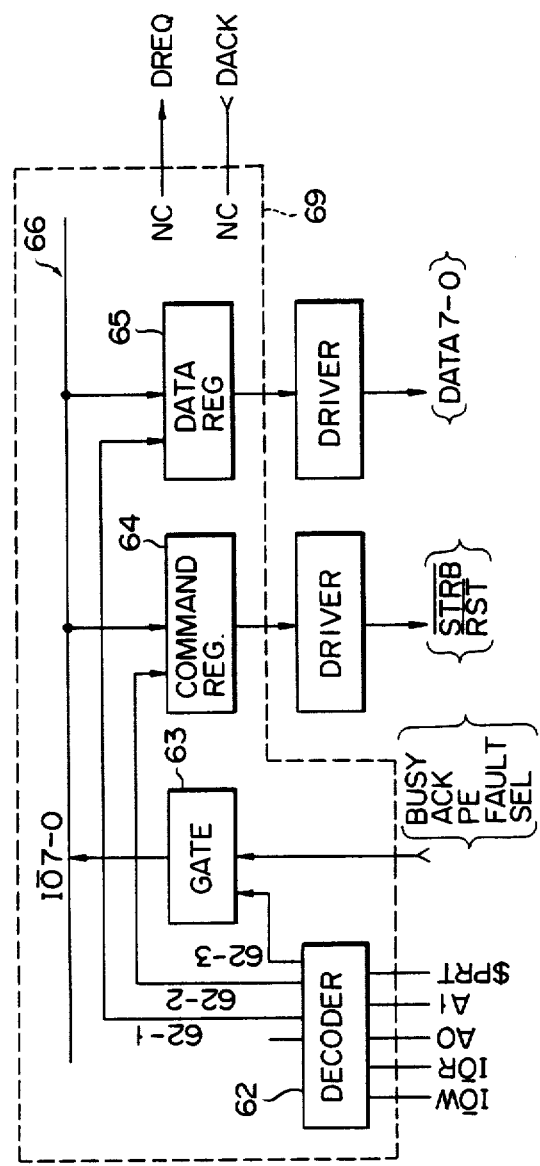
FIG. 5 is a block diagramm of a printer interface in a small personal computer system.

FIG. 5 shows an example of a printer interface of a small personal computer. The printer interface 69 comprises I/O address decoder 62, gate 63, command register 64, data register 65, and 8-bit input/output bus 66. Decoder 62 enables signal 62-1 in response to $\overline{\text{SPRT}} \cap \overline{\text{AI}} \cap \overline{\text{AO}} \cap \overline{\text{IOW}}$, signal 62-2 in response to $\overline{\text{SPRT}} \cap \overline{\text{AI}} \cap \text{AO} \cap \overline{\text{IOW}}$, and signal 62-3 in response to $\overline{\text{SPRT}} \cap \overline{\text{AI}} \cap \overline{\text{AO}} \cap \overline{\text{IOR}}$. $PRT is also C5510. Gate 63 outputs a status signal from the printer onto bus 66 when signal 62-3 is enabled. Register 64 generates signals STRB and RST in response to an instruction from the processor and sets the state of bus 66 in response to signal 62-3. Register 65 latches data to be printed at a timing of signal 62-1.

The operation of the interface 69 shown in FIG. 5 will be described with reference to FIG. 6. A processor (not shown) checks in step S1 if data has been transferred to a printer. If NO in step S1, step S2 is executed and the processor generates a signal input instruction. Signal 62-3 is enabled, a BUSY pulse is fetched by the processor, and it checks in step S2 if the BUSY pulse goes low. If NO in step S2, the flow returns to step S1. If YES in step S2, in step S3 a data output instruction is generated, signal 62-1 is enabled, and data to be printed is supplied to register 65. Sequentially, in step S4, a signal output instruction is generated, signal 62-2 is enabled, and a STRB pulse is output from register 64. The data is thus transferred to the printer. In step S5, a signal output stop instruction is generated, signal 62-2 is reset, the STRB pulse is cancelled, and a RST pulse is generated.

In this manner, in a small computer, the printing operation is executed while time is monitored every one-byte transfer, so that the processor is overloaded, and the improvement on system performance cannot be expected. This scheme, however, is most commonly adopted by small personal computers.

Figure 7:
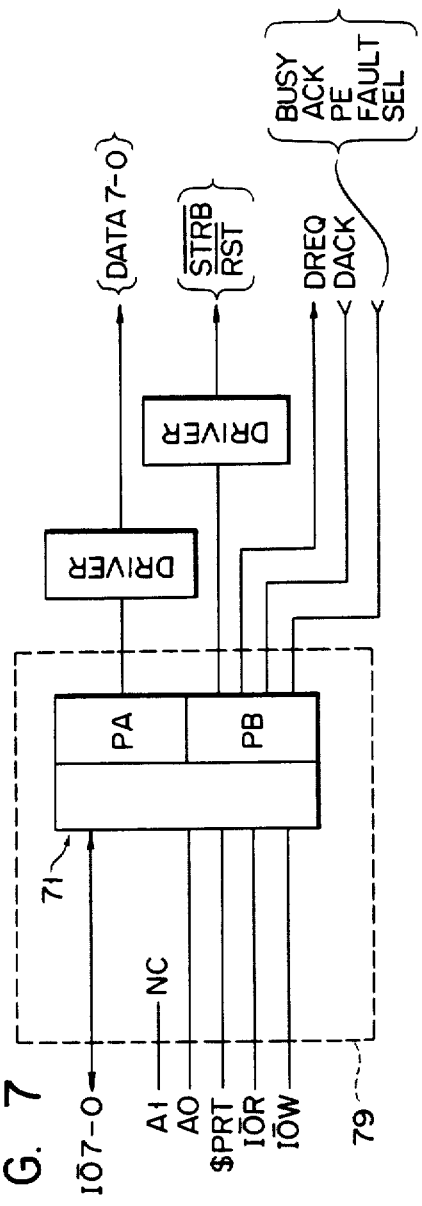
FIG. 7 is a block diagram of a printer interface in a large personal computer system.

FIG. 7 shows a block diagram of a printer interface of a large personal computer. In this case, the control timing pulses as shown in FIG. 5 are generated by subprocessor (one-chip microprocessor) 71. Data from a main memory (not shown) is transferred by a DMA controller and fetched by subprocessor 71. Subprocessor 71 is an equivalent to, e.g., Intel 8742.

With this scheme, the processor can transfer only a boot command to subprocessor 71 when the printing data is ready in the main memory. While the printer performs printing, the processor can execute other tasks (program), thereby improving the system performance.

When the block diagrams of FIGS. 5 and 7 are compared, the signals in the printers are the same, and only signals DREQ and DACK (not used in the system shown in FIG. 5) and Al (not used in the system shown in FIG. 7) in the systems are different. Therefore, it is possible to prepare circuits 69 and 79 within the broken lines as LSIs or IC cards using the same interface signals.

When the common circuit portions are made as LSIs in this manner, cartridges (application software cartridges known as ROM cartridges in personal computers and game machines) as well as IC sockets can be employed. Users can easily change the system configuration, thereby effectively utilizing hardware. Low-profile mounting techniques represented by IC cards can be employed and the number of compatible systems can be increased easily. As a result, true OA equipment, which is not mere special-purpose equipment such as a personal computer or a wordprocessor, can be provided.

What is claimed is:

1. A computer system, having a plurality of peripheral devices, and which is reconfigured to perform a plurality of functions including operation with selected combinations of such peripheral devices, comprising:

a system bus having a control bus and an address-data bus;

an address bus;

a microprocessor, connected to said system bus, for outputting an address to said address-data bus and control data to said control bus, for selectively outputting data to said address-data bus, and for selectively receiving input data from said address-data bus;

detachable circuit means, having a memory address map, for configuring the computer system to perform at least one of the plurality of functions using at least one of the peripheral devices by latching the address on said address-data bus, by supplying the latched address to said address bus, and by selectively generating an access control signal to select at least one of the peripheral devices in accordance with said latched address and said memory address map whereby the address generated by the computer system is mapped to the address space occupied by said peripheral devices;

memory means, responsive to said latched address on said address bus, said control data, and said access control signal, for selectively receiving and storing said output data from said address-data bus, and for selectively supplying said stored output data to said address-data bus;

connecting means for connecting said detachable circuit means to said address-data bus and to said control bus by means of a first connecting terminal arrangement; and wherein said detachable circuit means comprises means for latching the address on said address-data bus and means for supplying the latched address to said memory means via said address bus, and decoding means, responsive to said memory address map, for decoding said latched address and for selectively generating and supplying said access control signal to said memory means.

2. The computer system of claim 1, wherein said detachable circuit means also includes an integrated circuit removably connected to said computer.

3. The computer system of claim 1, wherein said detachable circuit means also includes a cartridge removably connected to said computer.

4. The computer system of claim 1, wherein said detachable circuit means also includes a large-scale integrated circuit removably connected to said computer.

5. The computer system of claim 1, wherein said decoding means further comprises means responsive to said latched address for generating said access control signal and wherein said detachable circuit means further comprises program storage means, responsive to said latched address, said control data and an access control signal, for storing a first program having an initial program loader program and a basic input/output system program and for supplying said first program to said address-data bus as said input data.

6. A computer system, having a plurality of peripheral devices, and which is configured to perform a plurality of functions including operation with selected combinations of such peripheral devices, comprising:

a system bus having a control bus and an address-data bus;

an address bus;

a microprocessor, connected to said system bus, for outputting an address to said address-data bus and control data to said control bus, for selectively outputting output data to said address-data bus, and for selectively receiving input data from said address-data bus;

detachable first circuit means, having a memory address map and an I/O address map, for configuring the computer system to perform at least one of the plurality of functions using at least one of the peripheral devices by latching said address from said address-data bus, by supplying said latched address to said address bus, and by selectively generating a first and a second access control signal responsive to said latched address, said memory address map and said I/O address map, whereby the address generated by the computer system is mapped to the address space occupied by said peripheral devices;

memory means, responsive to said latched address supplied to said address bus by said first circuit means, said control data and said first access control signal, for selectively receiving and storing said output data on said address-data bus, and for selectively supplying said stored output data to said address-data bus;

first connecting means for connecting said detachable first circuit means to said system bus and said address bus by means of a first connecting terminal arrangement;

detachable second circuit means, responsive to said address, said control data and said second access control signal, for selectively transferring data between said memory means and said peripheral devices and between said microprocessor and said peripheral devices; and second connecting means for connecting said detachable second circuit mdeans to said system bus, said address bus, and said peripheral devices by means of a second connecting terminal arrangement.

7. The computer system of claim 6, wherein said first and second circuit means each include an integrated circuit card.

8. The computer system of claim 6, wherein said first and second circuit means each include a cartridge.

9. The computer system of claim 6, wherein said first and second circuit means each include a large-scale integrated circuit different from said microprocessor.

10. The computer system of claim 6, wherein said first circuit means includes means for latching said address on said address-data bus, means for supplying said latched address to said memory means via said addres bus, and decoding means, having said memory and I/O maps, for decoding said latched address from said memory means and I/O address maps and for selectively supplying said first access control signal to said memory means and said second access control signal to said second circuit means.

11. The computer system of claim 10, wherein said decoding means includes means, responsive to said latched address, for generating a third access control signal and wherein said first circuit means comprises program storage means, responsive to said latched address, said control data and said third access control signal, for storing a first program having an initial program loader program and a basic input/output system program and for supplying said first program to said address-data bus as said input data.

* * * * *